Nov. 3, 1970

C. K. TAFT ET AL 3,537,798

DIGITAL PRESSURE TRANSDUCER

Filed Jan. 8, 1968

INVENTORS
ROBERT D. SMITH
CHARLES K. TAFT

BY

ATTORNEY.

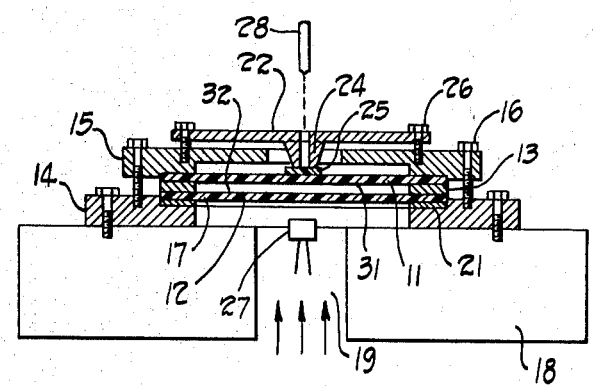
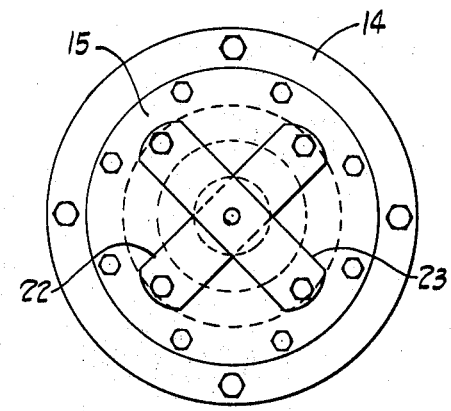
Fig. 4  Fig. 5
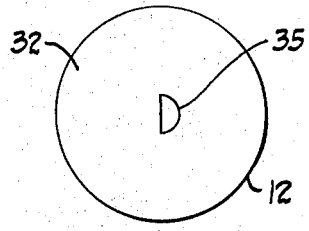 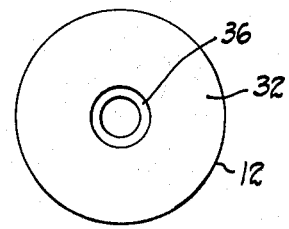 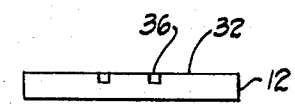
Fig. 6  Fig. 7  Fig. 8
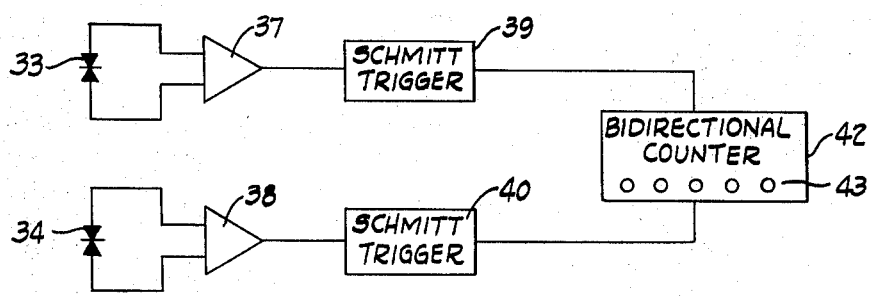
Fig. 10
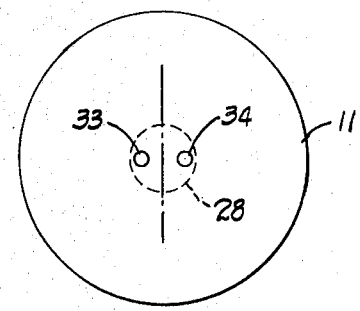
Fig. 9
INVENTORS.
ROBERT D. SMITH
CHARLES K. TAFT
BY
*Frederic B. Schramm*
ATTORNEY

United States Patent Office 3,537,798
Patented Nov. 3, 1970

3,537,798
DIGITAL PRESSURE TRANSDUCER
Charles K. Taft, Durham, N.H., and Robert D. Smith, Louisville, Ohio, assignors to Case Western Reserve University, a corporation of Ohio
Filed Jan. 8, 1968, Ser. No. 696,250
Int. Cl. G01b 9/02
U.S. Cl. 356—112     6 Claims

ABSTRACT OF THE DISCLOSURE

A digital pressure transducer is provided for converting an analog pressure signal into a digital signal by employing an interferometer principle. The transducer has upper and lower glass plates separated by a thin spacer therebetween, each plate having a reflective surface, and the plates are held together by a clamp. The transducer is arranged to have the pressure to be observed or measured applied to the lower plate. Means are provided for illuminating the lower plate and observing the curvature distortions effected by changes in pressure which manifest themselves in the form of interference fringes. These fringe movements are converted to digital signals.

---

In carrying out the invention in accordance with a preferred form thereof, a pair of circular glass plates with an annular spacer therebetween are clamped together between two rings. There is a light source to illuminate the surface of the lower plate and a pair of photo-diodes is mounted in the opening in the upper ring. The upper plate is prestressed to introduce a radius of curvature. The arrangement is such that the radius of curvature of the lower plate is reduced when the pressure on it bottom side is increased. This change in the radius of curvature causes movement of interference fringes or Newton's rings. These are counted by a light detector unit mounted within the upper clamping ring.

The light detector unit is connected to a suitable phase responsive circuit for not only counting the rings but indicating the direction of movement of the rings in order that it may be determined whether the pressure is increased or decreased.

A better understanding of the invention will be afforded by the following detailed description considered in conjunction with the accompanying drawing in which FIG. 1 is a diagram illustrating the appearance of interference fringes or Newton's rings.

FIG. 4 is a view of a section of the transducer represented as a cut by a plane passing through the axis of the transducer.

FIG. 5 is a top view of the transducer of FIGS. 2 to 4.

FIG. 6 is a diagram illustrating the location of a step formed in one of the glass plates in order to produce phase shift between the outputs of light detectors.

FIG. 7 is a plan view of one of the plates of the transducer of FIGS. 2 to 6 showing the location of a circular cut provided for maintaining flatness of the central portion of the plate.

FIG. 8 is a cross sectional view of the plate illustrated in FIG. 7.

FIG. 9 is a plan view of the top plate showing the light detector locations.

FIG. 10 is a schematic diagram of circuitry for counting fringes and registering changes in pressure whether increaing or decreasing.

Like reference characters are utilized throughout the drawing to designate like parts.

Figure 1:
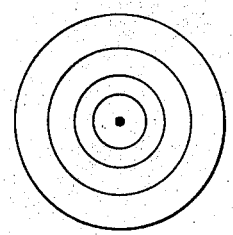
Figure 2:
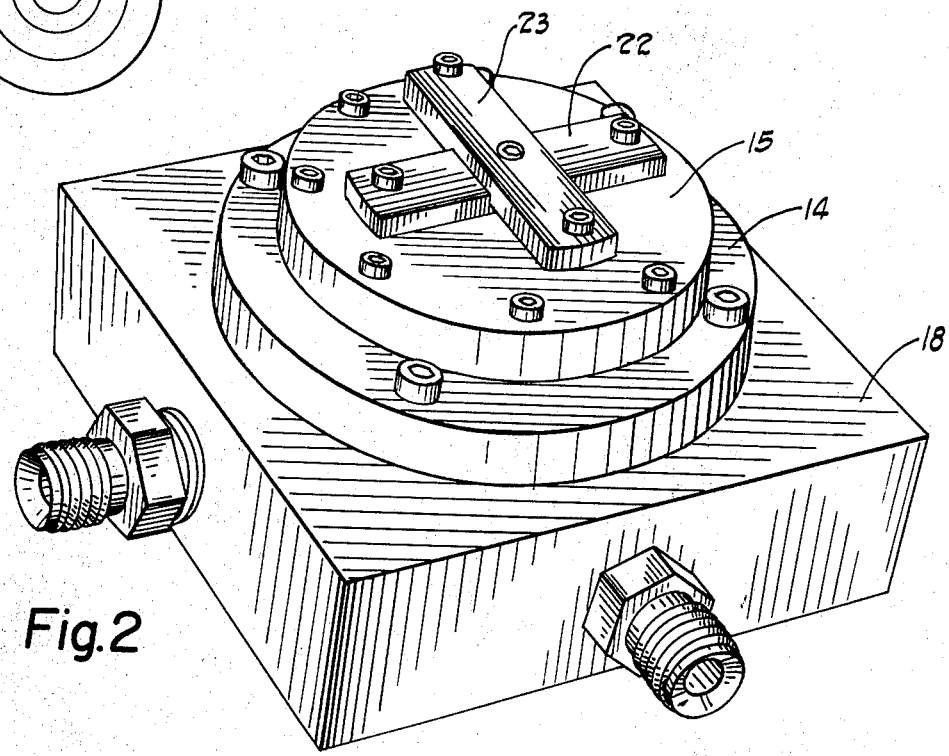
FIG. 2 is a perspective view of a flush mounted digital pressure transducer forming an embodiment of the invention.
Figure 3:
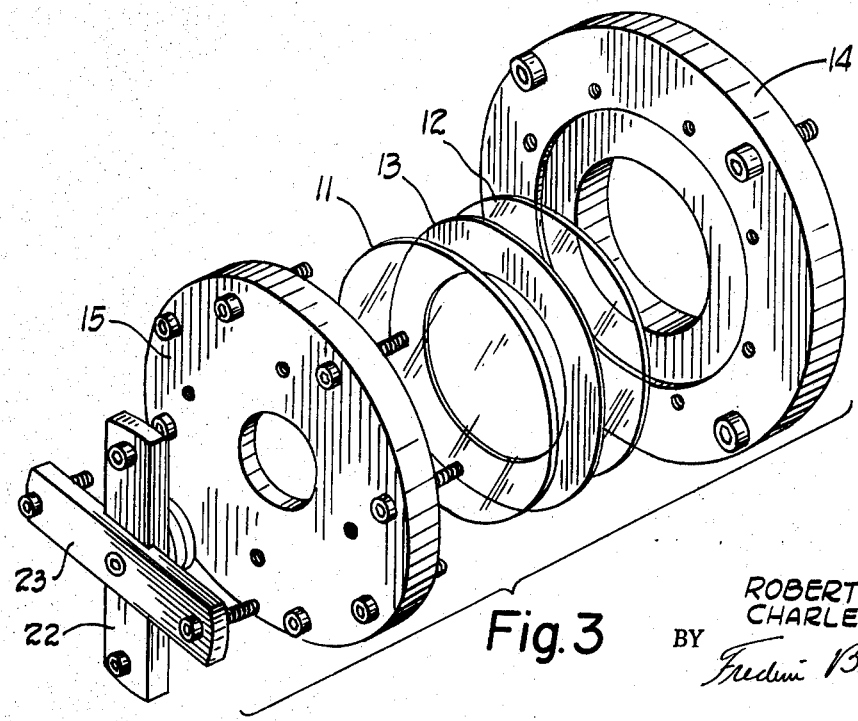
FIG. 3 is an exploded view of the pressure transducer of FIG. 2.

The tranducer illustrated in the drawings comprises a top plate 11, a bottom plate 12, shown as circular, held apart by an annular spacer 13, supported in a ring shaped mounting comprising a lower ring 14 and an upper ring, or circular clamp 15. Suitable means such as machine screws 16 are provided for holding down the circular clamp 15 against the mounting ring 14.

The assembly is so arranged as to expose the lower surface 17 of the plate 12 to a pressure to be measured or observed in a container or tank fragmentarily shown by an upper wall 18 having an opening 19 through which the pressure in the container 18 is applied to the lower surface 17 of the plate 12. Suitable means such as an annular seal or gasket 21 are provided between the plate 12 and the mounting ring 14 to make a pressure tight joint around the lower surface of the bottom plate 12. It will be understood that the mounting ring 14 is also sealed in a suitable manner against the pressure tank wall 18.

Preferably plate 11 is prestressed so as to be bowed downwardly to provide a radius of curvature. The radius of curvature of plate 12 is diminished when a pressure applied through the opening 19 is increased. Prestressing is accomplished by the provision of a suitable fixture which takes the form in the embodiment illustrated of a pair of cross members or arms 22 and 23 (FIG. 5) bearing at the center upon a pressure-tranmitting bushing 24 which in turn bears upon the center of the upper surface of the plate 11, preferably with resilient pressure distributing means such as a nylon washer 25 interposed between the lower end of the bushing 24 and the top of plate 11. Suitable means such as machine screws 26 at the ends of the prestressing fixture arm 22 and 23, threaded into the circular clamp 15, are provided for tightening downward on the prestressing fixture 22–23 for prestressing plate 11.

For illuminating the bottom plate 12 a lamp or suitable light source 27 is mounted in the pressure tank opening 19. This is shown as spaced from the lower surface 17 of the bottom plate 12 to simplify the drawing and may be so mounted when the medium in the pressure tank is transparent. However, if an opaque fluid is present in the pressure tank the light source 27 is mounted directly against and upon the lower surface 17 of the bottom plate 12. Since the top side of the bottom plate is the critical surface, this does not affect the operation of the transducer.

Within the bushing 24, a light-responsive unit 28 is mounted for detecting presence of light or dark fringes produced by interference between the light waves transmitted directly to the light-responsive unit 28 from the light source 27 and those reflected back and forth between the inner surfaces 31 and 32 of the top plate 11 and the bottom plate 12 respectively. It will be understood that the plates 31 and 32 act as an interferometer producing an interference pattern of light fringes in the form of Newton's rings as illustrated in FIG. 1.

These rings move inward and outward as variations in spacing between the reflecting surfaces 31 and 32 occur with variations in pressure. Consequently, the response of the light-responsive unit 28 serves as an indication of variations in pressure, and pressure may be measured by counting the rings as they move across the light-responsive unit 28 with variations in pressure. If the light-responsive unit 28 constitutes a single light-responsive element it will be subjected to dark and light effects as pressure changes and such changes may be counted to measure increments of pressure.

However, in order to facilitate indicating whether pressure is increasing or decreasing a phasing system is preferably provided. This may be accomplished by causing two separate light beams to be transmitted into the light-responsive unit 28 which are 90° out of phase and utilizing a pair of light-responsive elements in the light-responsive unit 28 as illustrated schematically in FIG. 9 by separate light-responsive elements or detectors 33 and 34. In order to produce the out of phase reflected light beam a step 35 is etched in the top surface 32 of the bottom plate 12 as illustrated in FIG. 6. A phase shift of 90° between the outputs of light-responsive detectors 33 and 34 is effected by forming the step 35 with a depth equal to ⅛ of a wave length of the light source 27 or an odd multiple of an ⅛ of a wave length.

As the pressure difference across the bottom plate 12 increases, the number of rings in the interference pattern increases and the spacing between the rings decreases. In order to avoid having the rings become too closely spaced and to prevent having the detectors monitor more than one fringe of the interference pattern, the plates are arranged to have the center portions remain nearly flat while the radius of the curvature of the plate changes. This is accomplished as illustrated in FIGS. 7 and 8 by incorporating a circular cut 36 in the center of the top surface 32 of the bottom plate 12 and the bottom surface 31 of the top plate 11.

Any suitable phase responsive circuit is connected to the light-responsive elements 33 and 34 for counting or recording the changes in position of the rings with changes in pressure.

The invention is not limited to the specific elements. However, satisfactory results have been employed by utilizing photodiodes type TIH 38. As the interference fringes move the photodiodes 33 and 34 produce a sine-wave output with the output of one diode in quadrature with that of the other. Preferably, the sine waves are converted to square waves in order that a mechanical or electronic counter may be more readily actuated.

A suitable system is illustrated schematically in FIG. 10 in which the outputs of the photodiodes 33 and 34 are supplied to amplifiers 37 and 38. The outputs of the amplifiers 37 and 38 in turn are supplied to suitable amplitude-limiting circuits such as Schmitt triggers 39 and 40, the output of which in turn is supplied to a suitable bidirectional counter 42 having a register 43 with dials or numerals indicating a digital value of the pressure. The bidirectional counter is in effect a quarter phase motor.

The present invention is not directed to the details of the bidirectional counter and any suitable bidirectional counter may be employed. Examples of both mechanical and electronic bidirectional counters are illustrated in Pat. No. 2,604,004, Root III.

Preferably a thin film which is reflective but will, nevertheless, transmit light is formed on the top surface 32 of the bottom plate and the bottom surface 31 of the top plate to increase the visibility of the transmitted interference pattern. Such a film may be formed by depositing a suitable metal such as aluminum or silver by a vacuum evaporation technique.

The linear displacement of the center of the bottom plate with increasing pressure is directly proportional to the pressure difference across the bottom plate. If the bottom plate moves, the center of the interference pattern alternates from light to dark, and so forth. This intensity variation is monitored by the two light detectors 33 and 34 which are mounted in the center of the prestressing fixture 22-23.

The interferometer configuration provided by the transducer as described has the advantage of ease in alignment. The prestressing fixture maintains the center of the interference pattern directly below the photoelectric detectors. Moreover the transducer remains aligned.

The transducer does not require the use of expensive optical glass because proper alignment is achieved by mechanical means and is not dependent upon precise optical calculation. Commercial grade glass may be used. Although it is not necessary, it is advantageous that each glass plate have surfaces which are not strictly parallel optically in order that the interference fringes be those produced by spacing between surfaces 31 and 32 rather than between opposite surfaces of a single plate.

Moreover the transducer can be made very small. The transducer can be used with a nonmonochromatic source for small plate separations. A monochromatic source is desirable. Nevertheless, a nonmonochromatic source such as a gallium arsenide electro-illuminous diode has been used successfully for small plate separations.

The transducer or encoder illustrated in the drawings, particularly FIG. 4, measures the pressure difference across the bottom plate 12. If vents are provided in the spacer 13, the pressure between the two plates is atmospheric pressure, and the pressure on the bottom side of 17 of the bottom plate 12 is then measured with respect to atmospheric pressure. It will be observed that pressures both above and below atmospheric pressure can thus be measured.

The physical properties of the medium of which the pressure is being measured are relatively unimportant since the medium never enters the space between the two glass plates 11 and 12. The only restriction on the medium is that it must not be corrosive to the parts of the transducer with which it is in contact.

The invention is not limited to the use of a particular type of light source, but satisfactory results have been achieved employing one of the type HPA 4106.

While the invention has been described as embodied in concrete form, and as operating in a specific manner in accordance with the provisions of the patent statutes, it should be understood that the invention is not limited thereto, since various modifications will suggest themselves to those skilled in the art without departing from the spirit of the invention.

We claim:

1. A pressure transducer comprising in combination: mounting means,
   first and second semi-reflective plates held by said mounting means with their surfaces in substantially parallel spaced relation to each other,
   said mounting means further comprising a pre-stressing fixture having bearing surface means in contact with a portion of said second plate causing a curvature in said plate,
   a groove in said first plate surrounding said portion of said second plate whereby the area inside the groove will remain nearly flat while the curvature of said first plate changes with variations in pressure applied thereto,
   a light source mounted adjacent the outside surface of said first plate causing interference fringes to be formed by said plates, and,
   photoelectric responsive means mounted adjacent the outside surface of said second plate for detecting said interference fringes.

2. A pressure transducer as described in claim 1 wherein the photoelectric response means comprises two photo-responsive elements and the first plate has a step cut therein forming a surface spaced from the remainder of the surface of the plate a distance of one-eighth of the wave length of the source of light illuminating said plates whereby increasing and decreasing pressure may be differentiated.

3. A pressure transducer as described in claim 1 wherein said mounting means comprises a circular clamp comprising a pair of annular members between which the plates are clamped, an annular spacer between the plates, and means for holding the annular clamp members together.

4. A pressure transducer as described in claim 3 wherein said prestressing fixture comprises members secured to the annular clamp member resting against the second plate and means between the outer surface of the second plate and cross members for transmitting pressure to the outer surface of the second plate.

5. A pressure transducer as described in claim 4 wherein the photoelectric responsive means comprises a pair of photodiodes.

6. A pressure transducer as described in claim 2 comprising a pair of amplitude limiting elements each responsively connected to one of the photoelectric responsive elements and a bi-directional counter connected with and jointly responsive to the said amplitude limiting devices.

References Cited

UNITED STATES PATENTS

| | | | |
|---|---|---|---|
| 2,381,728 | 8/1945 | Dimmick | 356—112 |
| 2,410,502 | 11/1946 | Hurley | 356—106 |
| 3,040,583 | 6/1962 | Post | 356—108 X |
| 3,158,674 | 11/1964 | Woodson | 356—106 |

RONALD L. WIBERT, Primary Examiner

T. MAJOR, Assistant Examiner

U.S. Cl. X.R.

73—388